(12) United States Patent
Anderson et al.

(10) Patent No.: US 6,668,763 B2
(45) Date of Patent: Dec. 30, 2003

(54) PROCESS FOR IN-SITU PRODUCTION OF HYDROGEN ($H_2$) BY ALCOHOL DECOMPOSITION FOR EMISSION REDUCTION FROM INTERNAL COMBUSTION ENGINES

(75) Inventors: Kenneth B. Anderson, Lisle, IL (US); Kathleen Carrado-Gregar, Naperville, IL (US); Christopher L. Marshall, Naperville, IL (US); Scott R. Segal, Endwell, NY (US)

(73) Assignee: The University of Chicago, Chicago, IL (US)

(*) Notice: Subject to any disclaimer, the term of this patent is extended or adjusted under 35 U.S.C. 154(b) by 10 days.

(21) Appl. No.: 10/095,597

(22) Filed: Mar. 11, 2002

(65) Prior Publication Data

US 2003/0168023 A1 Sep. 11, 2003

(51) Int. Cl.$^7$ ................................................. F02B 75/12
(52) U.S. Cl. ........................................ 123/3; 123/527
(58) Field of Search .............................. 123/3, 1 A, 527

(56) References Cited

U.S. PATENT DOCUMENTS

| | | | |
|---|---|---|---|
| 1,966,345 A | | 7/1937 | Harrell |
| 3,908,606 A | | 9/1975 | Toyoda et al. |
| 4,170,200 A | | 10/1979 | Takeuchi et al. |
| 4,475,484 A | * | 10/1984 | Filho et al. ............. 123/3 |
| 4,476,818 A | | 10/1984 | Yoon |
| 4,519,342 A | * | 5/1985 | Yoon ....................... 123/3 |
| 4,862,836 A | * | 9/1989 | Chen et al. ............... 123/3 |
| 4,876,989 A | * | 10/1989 | Karpuk et al. ............ 123/3 |
| 4,884,531 A | * | 12/1989 | Degnan, Jr. et al. ....... 123/3 |
| 5,007,381 A | * | 4/1991 | Kakegawa et al. ......... 123/3 |
| 5,092,303 A | * | 3/1992 | Brown ..................... 123/3 |
| 5,463,155 A | * | 10/1995 | Galperin et al. ......... 585/310 |
| 6,190,534 B1 | * | 2/2001 | Bogdan ................... 208/65 |
| 6,340,003 B1 | * | 1/2002 | Schoubye et al. ......... 123/3 |
| 6,419,890 B1 | * | 7/2002 | Li ....................... 423/239.1 |
| 6,463,889 B2 | * | 10/2002 | Reddy .................... 123/3 |
| 6,502,533 B1 | * | 1/2003 | Meacham .................. 123/3 |

* cited by examiner

Primary Examiner—Henry C. Yuen
Assistant Examiner—Jason Benton
(74) Attorney, Agent, or Firm—Joan Pennington

(57) ABSTRACT

A process and apparatus are provided for in-situ production of hydrogen ($H_2$) by alcohol decomposition for emission reduction from internal combustion engines. Hydrogen is generated by a catalytic process for in-situ production from alcohols, either neat, or in a hydrocarbon mixture, such as gasoline. The in-situ production of hydrogen is achieved using a solid basic catalytic bed provided with the internal combustion engine. The preferred catalyst is a copper (Cu) containing layered double hydroxide (LDH)-derived catalyst, such as a Cu/Al LDH-derived catalyst. At least a portion of an alcohol containing fuel is passed through the catalyst bed to generate hydrogen gas from the alcohol substantially without producing carbon monoxide. The fuel and generated hydrogen gas is injected into the internal combustion engine. Catalytic reactions are provided at temperatures in a range between ambient and 500° C., preferably between 150° C. through 400° C.

20 Claims, 10 Drawing Sheets

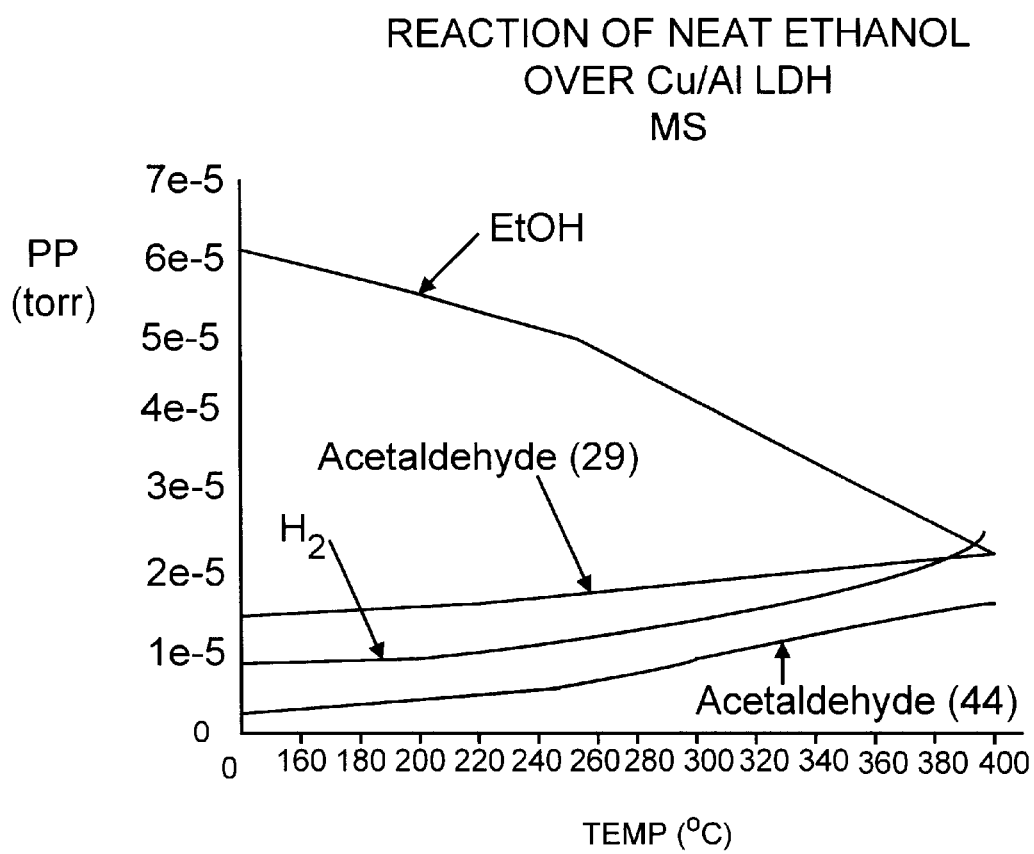

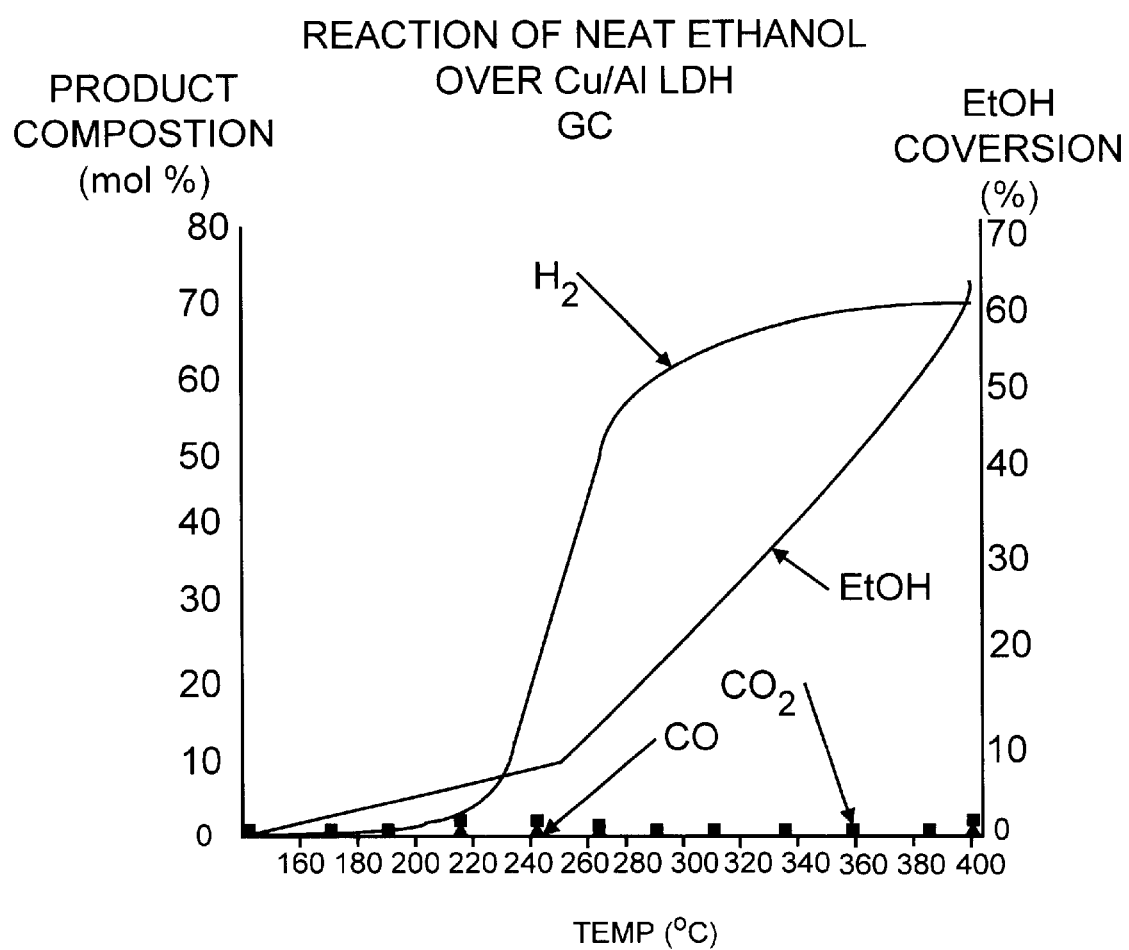

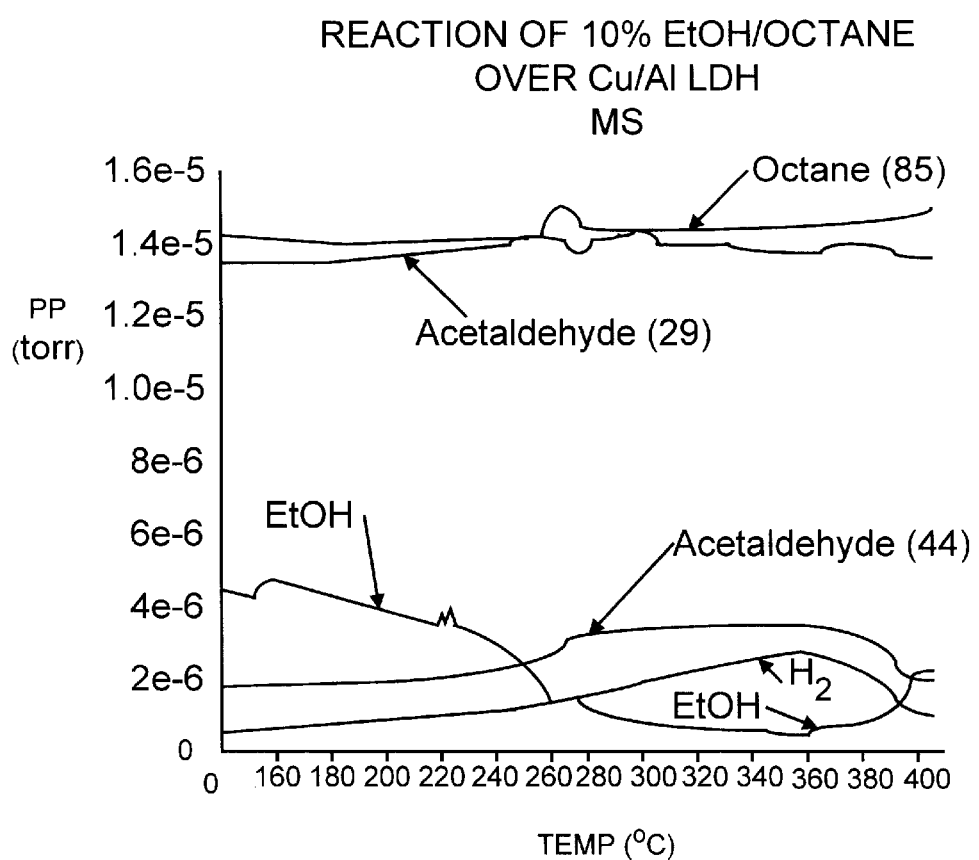

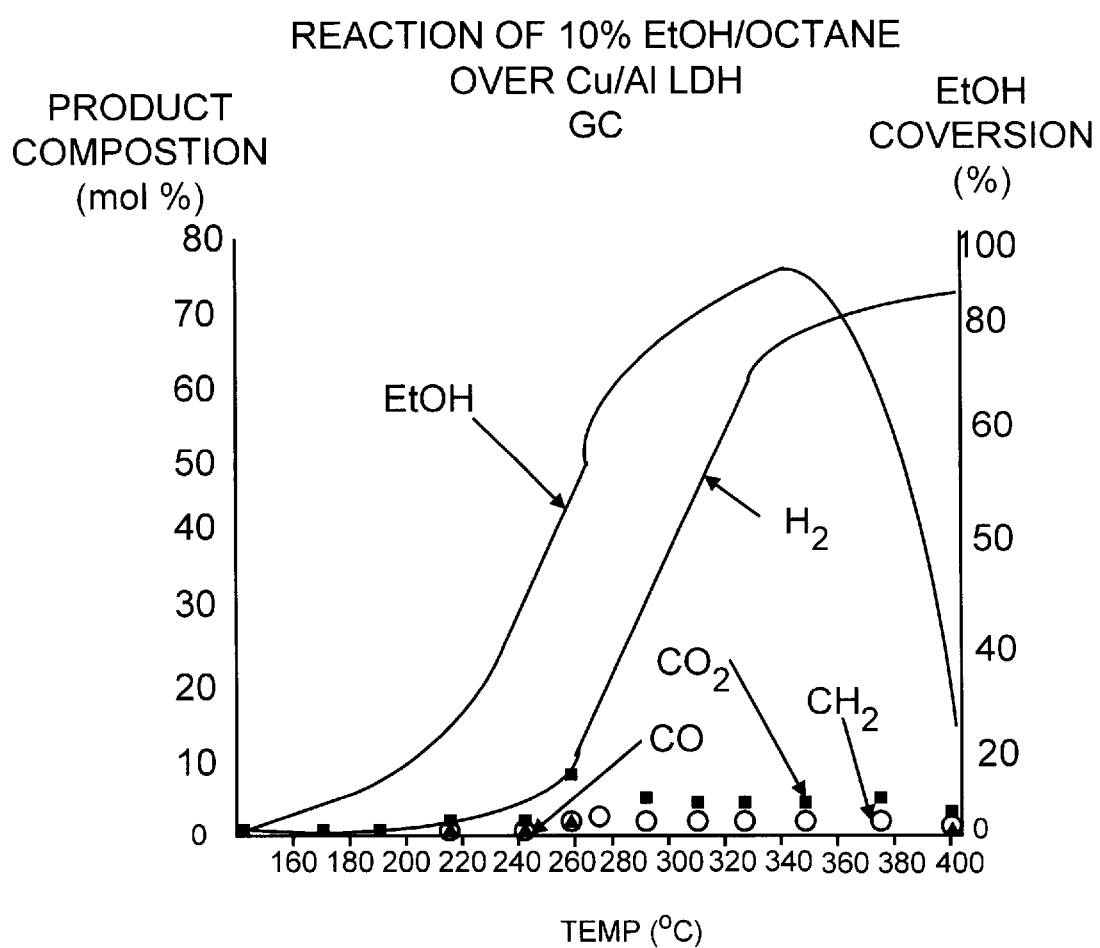

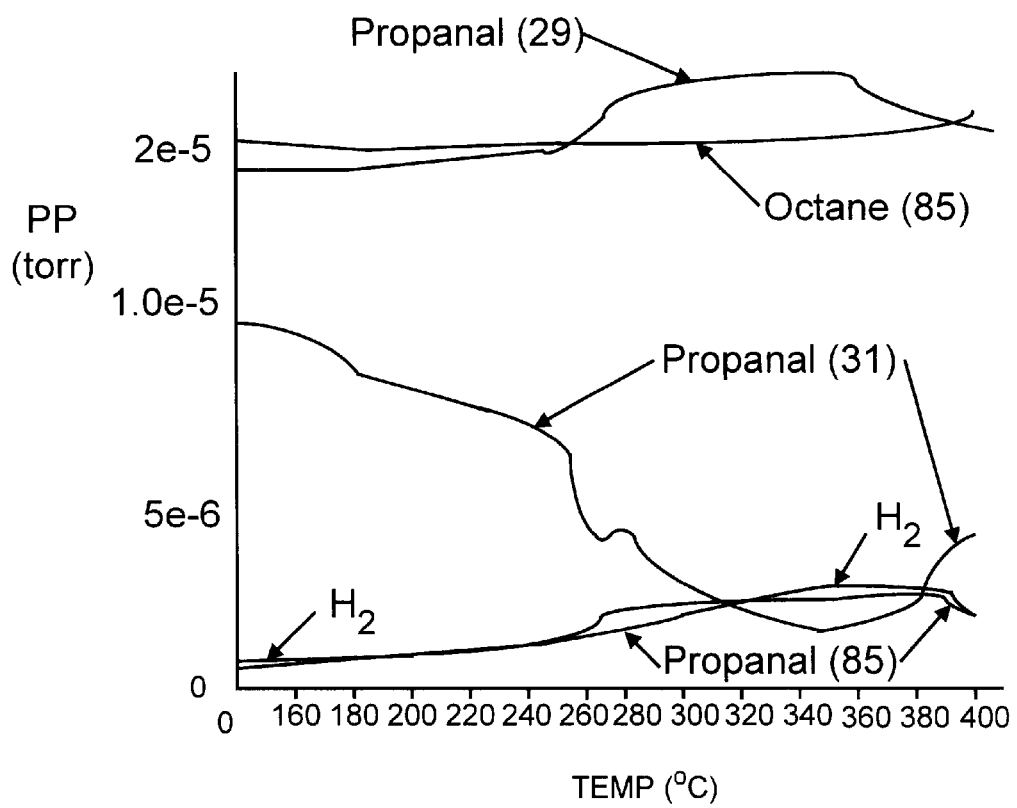

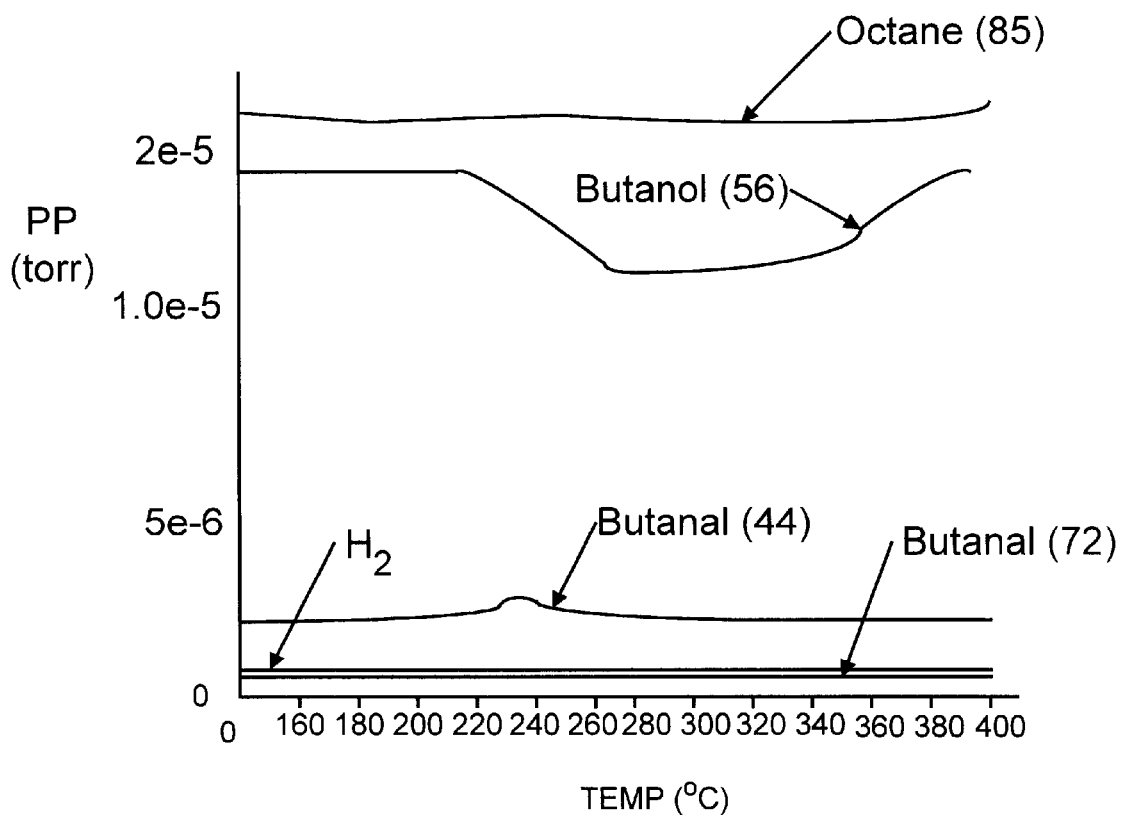

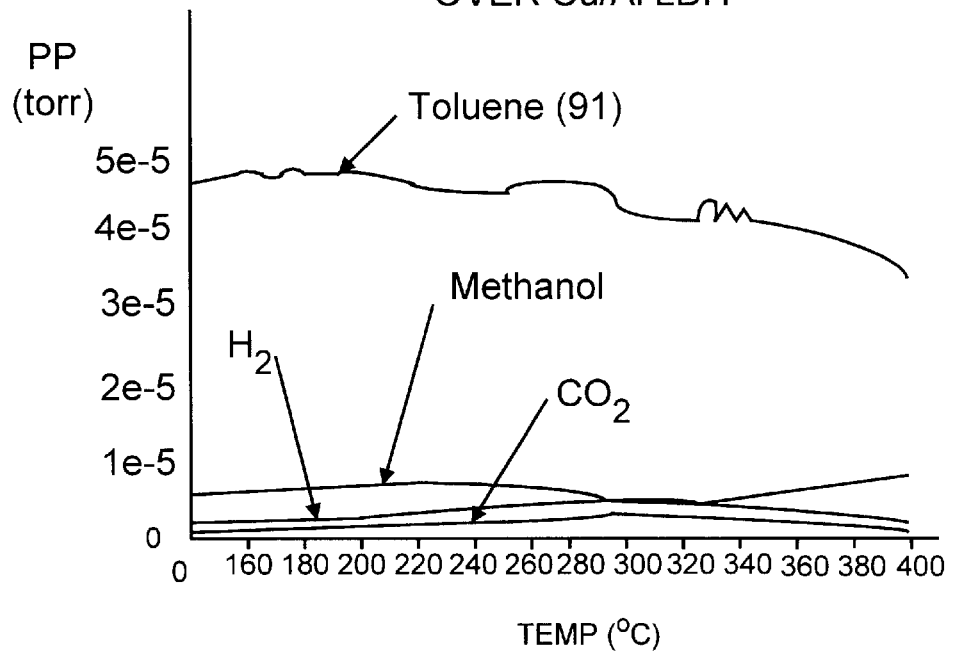

REACTION OF 10% EtOH/Sim GASOLINE OVER Cu/Al LDH

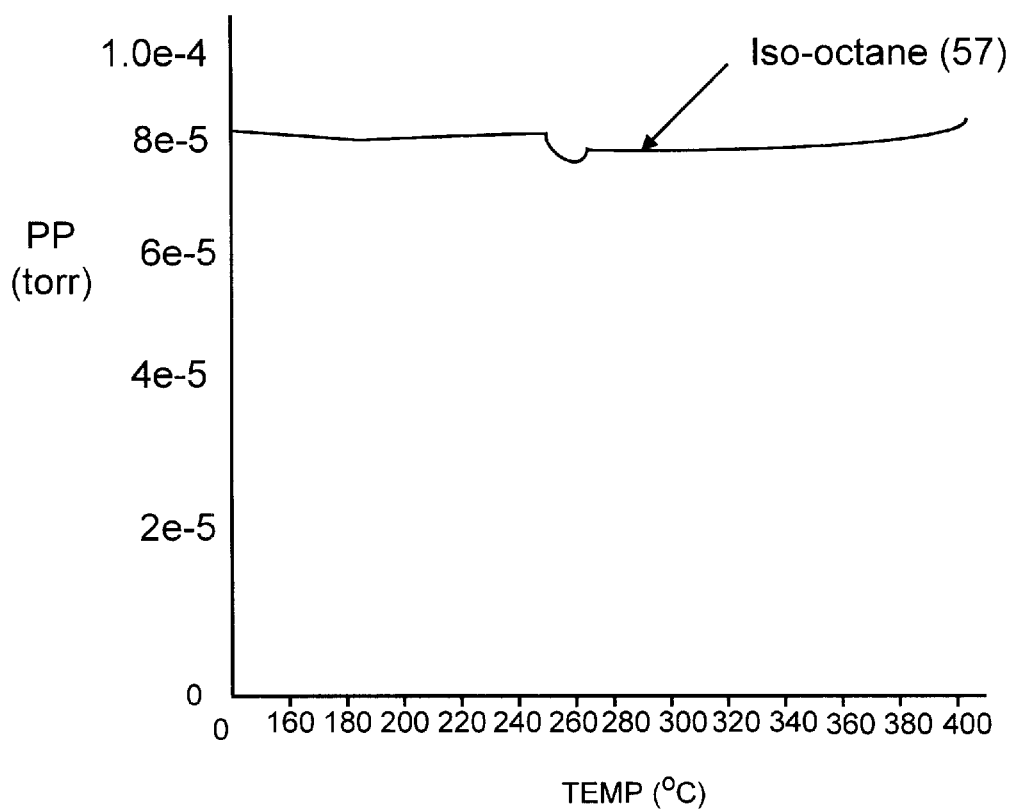

PROCESS FOR IN-SITU PRODUCTION OF HYDROGEN ($H_2$) BY ALCOHOL DECOMPOSITION FOR EMISSION REDUCTION FROM INTERNAL COMBUSTION ENGINES

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to a process for in-situ production of hydrogen ($H_2$) by alcohol decomposition for emission reduction from internal combustion engines.

DESCRIPTION OF THE RELATED ART

There is currently considerable interest in vehicle emission reduction technology, and legislative established standards for vehicle emissions are becoming increasingly more stringent. A number of approaches to achieving ultra-low emission vehicle (ULEV) designs are currently being evaluated. These include: use of electric vehicles, use of $H_2$ powered (fuel cell) vehicles, and use of catalytic devices for removal of harmful components from tail-pipe emissions.

An alternative approach which may achieve the same ends is to modify combustion conditions within existing or slightly modified internal combustion (IC) engines such that the levels of harmful products produced, such as, $NO_x$, $SO_x$, CO, and the like, is significantly reduced. One very promising technology for achieving this is the addition of small amounts of $H_2$ to the combustion chamber. This has been shown to reduce pollutant levels significantly. The addition of small amounts of $H_2$ to the combustion chamber of an internal combustion engine results in increased fuel efficiency and significantly reduces emissions.

The principle draw back to widespread application of this technology has been the difficulty in providing a reliable hydrogen source. Obviously it is not desirable to equip vehicles with stored high pressure $H_2$, and no infra structure for refueling vehicles so equipped exists. Improved storage devices may alleviate this to some degree, but in any event, for conventional vehicles the need to maintain two discrete combustible fuels is a major disadvantage.

As an alternative, it has been proposed to liberate $H_2$ from conventional fuels by use of dehydrogenation catalysts. This approach has proven very difficult due to low and variable levels of hydroaromatic fuel components which are susceptible to dehydrogenation, and due to deactivation of the dehydrogenation catalyst due to carbonization reactions or coking.

It is desirable to provide a process for in-situ production of hydrogen for emission reduction from internal combustion engines. It is desirable to develop such a process for in-situ production of hydrogen for emission reduction from internal combustion engines that is effective and that is generally inexpensive to implement. It is desirable to provide a process for in-situ production of hydrogen from automotive fuels under realistic conditions.

SUMMARY OF THE INVENTION

A principal object of the present invention is to provide a process and apparatus for in-situ production of hydrogen by alcohol decomposition for emission reduction from internal combustion engines. Other important objects of the present invention are to provide such process and apparatus for in-situ production of hydrogen ($H_2$) by alcohol decomposition for emission reduction from internal combustion engines substantially without negative effect; and that overcome some disadvantages of prior art arrangements.

In brief, a process and apparatus are provided for in-situ production of hydrogen ($H_2$) by alcohol decomposition for emission reduction from internal combustion engines. $H_2$ is generated by a catalytic process for in-situ production of hydrogen from alcohols, either neat, or in a hydrocarbon mixture, such as gasoline.

The in-situ production of $H_2$ of the invention is achieved using a solid basic catalytic bed provided with the internal combustion engine. At least a portion of an alcohol containing fuel for the internal combustion engine is passed through the catalyst bed to generate a $H_2$ gas from the alcohol. The generated $H_2$ gas is injected into the internal combustion engine.

In accordance with features of the invention, a copper (Cu) containing layered double hydroxide (LDH)-derived catalyst, such as a Cu/Al LDH-derived catalyst, is used. Catalytic reactions occur at temperatures in a range between ambient temperature and 500° C., preferably between 150° C. through 400° C. The $H_2$ gas is produced substantially without producing carbon monoxide.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A and 2B are graphs illustrating the reaction of neat ethanol over Cu/Al layered double hydroxide (LDH)-derived catalyst in accordance with the preferred embodiment;

FIGS. 3A and 3B are graphs illustrating the reaction of 10% ethanol/octane over Cu/Al LDH-derived catalyst in accordance with the preferred embodiment;

FIG. 4 is a graph illustrating the reaction of another alcohol/octane, 10% 1-propanol/octane, over Cu/Al LDH-derived catalyst in accordance with the preferred embodiment;

FIG. 5 is a graph illustrating the reaction of another alcohol/octane, 10% 1-butanol/octane, over Cu/Al LDH-derived catalyst in accordance with the preferred embodiment;

FIG. 6 is a graph illustrating the reaction of 10% methanol/toluene, over Cu/Al LDH-derived catalyst in accordance with the preferred embodiment; and FIGS. 7A and 7B are graphs illustrating the reaction of 10% ethanol/simulated-gasoline over Cu/Al LDH-derived catalyst in accordance with the preferred embodiment.

DETAILED DESCRIPTION OF THE PREFERRED EMBODIMENTS

In accordance with features of the invention, $H_2$ generation is achieved by catalytic decomposition of alcohol. Alcohol is now a significant component in reformulated fuels for conventional internal combustion (IC) powered vehicles in the United States. In response to environmental concerns, many gasolines in the United States and some other countries have recently been reformulated to include oxygenates such as ethanol. The $H_2$ generation process of the invention produces $H_2$ in situ advantageously using the reformulated gasoline that includes for example, a significant fraction of ethanol in the gasoline. The advantage of using alcohols to produce $H_2$ is that alcohols such as methanol and ethanol are relatively inexpensive, are renewable fuels, and are already present in a large fraction of the gasoline pool. Decomposition of alcohols with concomitant production of $H_2$ of the invention is achieved using solid basic media, such as can be derived from layered double hydroxides (LDHs) or similar materials.

Figure 1:
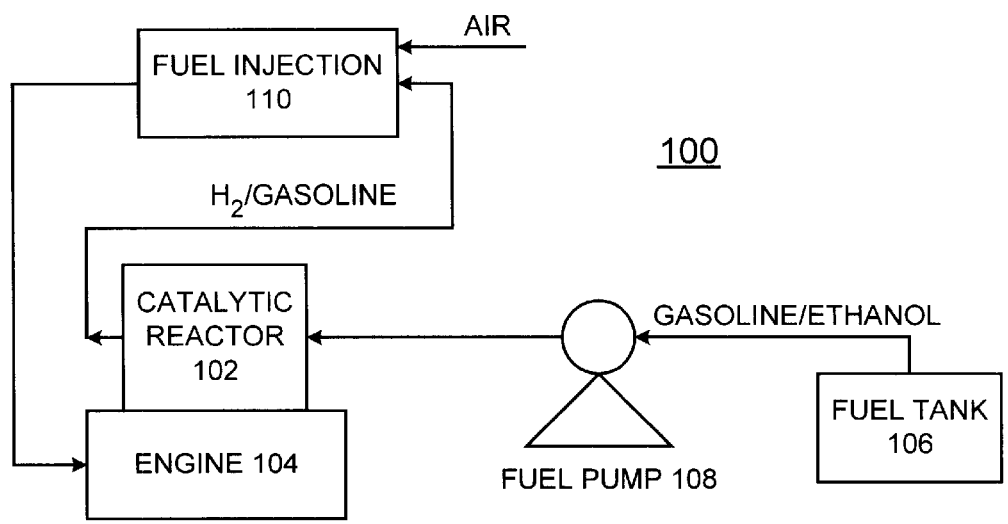
FIG. 1 is a block diagram representation illustrating apparatus for $H_2$ generation by catalytic decomposition of alcohol for emission reduction from internal combustion engines in accordance with the preferred embodiment.

Having reference now to the drawings, FIG. 1 illustrates apparatus generally designated by the reference character 100 for $H_2$ generation by catalytic decomposition of alcohol for emission reduction from internal combustion engines in accordance with the preferred embodiment. Emission reduction apparatus 100 includes a catalytic bed or reactor 102 of the preferred embodiment. Catalytic reactor 102 is a small catalytic reactor loaded with a solid base that is added to a conventional internal combustion (IC) engine 104. An alcohol containing fuel indicated at a line GASOLINE/ETHANOL from a fuel tank 106 is applied by a fuel pump 108 to the catalytic bed or reactor 102. The alcohol containing fuel is passed through the catalyst bed 102 to generate a $H_2$ gas from the alcohol. The fuel with generated $H_2$ gas indicated at a line $H_2$/GASOLINE is mixed with air and injected into the internal combustion engine 104 via a fuel injection system 110. The fuel injection system 110 is a conventional fuel injection system or modification thereof.

In accordance with features of the invention, the catalytic process of the preferred embodiment can be used for the production of $H_2$ from alcohols, either neat, or in a hydrocarbon or gasoline mixture. $H_2$ can be produced from a variety of alcohols, such as methanol, ethanol, propanol, isopropanol, butanol, and the like. The catalytic process for the production of $H_2$ of the preferred embodiment can be used without requiring a separate alcohol supply and generally without requiring fuel composition changes or minimal fuel composition changes.

It should be understood that a slip stream of the total fuel stream can be drawn off the fuel line and sent to the catalytic reactor 102 where the alcohol is decomposed resulting in generation of a hydrogen gas. The entire effluent from the catalytic reactor 102 is then recombined with the main fuel stream prior to fuel injection into the internal combustion engine.

In accordance with features of the invention, the catalytic process for the production of $H_2$ of the preferred embodiment can achieve significant emission reduction in IC powered vehicles with only minimal modification of existing internal combustion engine design requirements. Hence the desired environmental benefits can be achieved with a minimum capital investment.

The catalyst reactor 102 of the preferred embodiment is a copper (Cu) containing layered double hydroxide (LDH)-derived catalyst, such as a Cu/Al LDH-derived catalyst. Layered double hydroxides (LDHs) belong to a class of anionic clays having a hydrotalcite-like structure. The general molecular formula is: $(M^{2+}_{1-x}M^{3+}_x(OH)_2)$ $(A^{n-})_{x/n}\cdot mH_2O$, where $M^{2+}$ and $M^{3+}$ are metal cations which are cross-linked through hydroxide groups to form a dimetal hydroxide sheet, similar to that of brucite $(Mg(OH)_2)$. Some of the divalent metal cations are substituted by trivalent metal cations to form positively charged sheets. The excess positive charge of the layered network is compensated by anions $(A^{n-})$, which occupy the interlayer space along with water molecules. Numerous LDHs having a wide variety of $M^{2+}/M^{3+}$ cation pairs with different anions in the interlayer have been reported. They have many applications, including catalysts, catalyst supports, ion exchangers, adsorbents, antiacids, flame retardants, and corrosion inhibitors.

Many reports have concentrated on the use of LDHs as precursors to mixed oxide catalysts that are formed during their thermal decomposition. Upon heating, LDHs reversibly lose water from their interlayers up until about 150° C. At higher temperatures, the LDH structure reversibly changes via dehydroxylation to a mixed metal oxide phase. Therefore, between operating temperatures of about 150–400° C., the active catalyst is more correctly referred to as an LDH-derived material. At temperatures above approximately 400° C. the mixed metal oxide phase remains, but the structural change becomes irreversible. The mixed metal oxides formed during thermal decomposition of LDHs are excellent catalysts due to their large surface areas, basic properties, high metal dispersions and stability against sintering. Such metal oxides are known to promote base-catalyzed reactions such as polymerization, condensation, hydrogenation, and total oxidation of volatile organic compounds. A few reports have shown that mixed metal oxides derived from LDHs are active catalysts in the steam reforming of methanol, including those with the metal combinations Cu/Zn/Al, Ni/Al, and Co/Al.

A variety of LDH-derived catalysts have been prepared and tested. The LDHs have been prepared over a range of compositions, incorporating a variety of metals. The most active catalyst tested is a copper-containing LDH-derived material. The only products of catalytic process of the preferred embodiment that have been detected are $CO_2$ and $H_2$. The production of CO is substantially eliminated in the catalytic process of the preferred embodiment.

Alcohol or an alcohol/hydrocarbon mixture is passed over the Cu/Al LDH-derived catalyst for providing catalytic reactions at temperatures in a range between 150° C. through 400° C. Typically, $H_2$ production is observed starting at around 220° C., and continues to be produced up to 400° C. Above 400° C., irreversible catalyst deactivation is observed.

Also, with effective catalysts and conditions, the same process could be used for production of acetaldehyde and/or acetic acid, with concomitant production of hydrogen, for commercial production of these commodity chemicals from alcohol.

While the alcohol containing fuel is indicated as gasoline/ethanol in FIG. 1, other alcohols, for example, methanol, propanol, and the like, can also be used as feedstocks. The process of the preferred embodiment can be successfully applied to methanol according to the following equation:

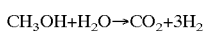
$$CH_3OH+H_2O \rightarrow CO_2+3H_2$$

This very important observation dramatically increases the potential applications of LDH or LDH-derived catalyzed alcohol oxidation. The only products of this reaction detected so far are $CO_2$ and $H_2$. That is, this process appears to be useful for production of CO-free hydrogen by catalytic oxidation of aqueous methanol. This means that in addition to being useful in conventional vehicles, LDH or LDH-derived catalyzed processes may be useful in methanol fueled fuel-powered vehicles and potentially in other smaller fuel cell-powered devices.

EXAMPLES

Example 1

1. Catalyst Preparation

The LDHs were prepared using a standard co-precipitation technique similar to that reported by Valente et al. The syntheses were performed at room temperature in air. The LDHs were synthesized by drop-wise addition of an aqueous solution containing 2M NaOH and 0.5M $Na_2CO_3$ to an aqueous $M^{2+}/M^{3+}$ nitrate salt solution and vigorous stirring. The $M^{2+}/M^{3+}$ ratio is 3 ($M^{2+}$=0.75 M, $M^{3+}$=0.25 M). The $NaOH/Na_2CO_3$ solution was added using a pH stat instrument (718 Stat Titrino, Metrohm), to maintain constant pH. All syntheses were done at pH=9.00±0.02, except for the Cu/Al LDH (pH=8.00±0.02). The $M^{2+}/M^{3+}$ solution was added at a constant rate (0.4 ml/min) using a 776 Dosimat (Metrohm) instrument. After addition of all reagents, the solutions were heated overnight at 65° C. with stirring. The samples were then filtered, washed several times with deionized water and dried in air at 80° C. for 18 h.

Example 2

Referring now to FIGS. 2A, 2B, 3A, 3B, 4, 5, 6, 7A and 7B, there are shown examples where $H_2$ is generated by the catalytic reaction process of the invention. The illustrated reactions include neat ethanol, 10% ethanol/octane, 10% 1-propanol/octane, 10% 1-butanol/octane, and 10% methanol/toluene over Cu/Al LDH-derived catalyst.

FIGS. 2A and 2B generally illustrate the reaction of neat ethanol over Cu/Al layered double hydroxide (LDH)-derived catalyst in accordance with the preferred embodiment. The conditions are 0.150 g Cu/Al LDH, temperature (T) ramp of 2° C./minute, 100% ethanol, and liquid flow rate of 0.2 ml/min. In the absence of water, ethanol decomposes to $H_2$ and acetaldehyde. This mechanism probably does not involve steam reforming. Hydrogen production is observed through 400° C. Ethanol dehydrogenation is represented by:

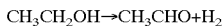

$$CH_3CH_2OH \rightarrow CH_3CHO + H_2$$

Example 3

FIGS. 3A and 3B generally illustrate the reaction of 10% ethanol/octane over Cu/Al LDH-derived catalyst in accordance with the preferred embodiment. The conditions are 0.150 g Cu/Al LDH, temperature (T) ramp of 2° C./minute, and liquid flow rate of 0.2 ml/min. Hydrogen and acetaldehyde are produced at similar temperature and concentration as in the neat ethanol illustrated in FIGS. 2A and 2B. No significant octane decomposition results. It appears that $H_2$ is formed from ethanol and that irreversible deactivation occurs at about 375° C.

Example 4

FIG. 4 generally illustrates the reaction of another alcohol/octane, 10% 1-propanol/octane, over Cu/Al LDH-derived catalystn accordance with the preferred embodiment. FIG. 5 generally illustrates the reaction of another alcohol/octane, 10% 1-butanol/octane, over Cu/Al LDH-derived catalyst in accordance with the preferred embodiment. The conditions are 0.150 g Cu/Al LDH, temperature (T) ramp of 2° C./minute, and liquid flow rate of 0.2 ml/min. Both 1-propanol and 1-butanol decompose to hydrogen and corresponding aldehydes, proponal and butanol in octrance mixture by dehydrogenation. Deactivation is still observed at high temperatures.

Example 5

FIG. 6 generally illustrates the reaction of 10% methanol/toluene, over Cu/Al LDH-derived catalyst in accordance with the preferred embodiment. The conditions are 0.150 g Cu/Al LDH, temperature (T) ramp of 2° C./minute, and liquid flow rate of 0.2 ml/min. It appears that hydrogen production begins at about 235° C., and that no apparent deactivation occurs. It appears that methanol conversion increases with temperature. Toluene decomposition also appears to occur.

Example 6

Figure 7A:
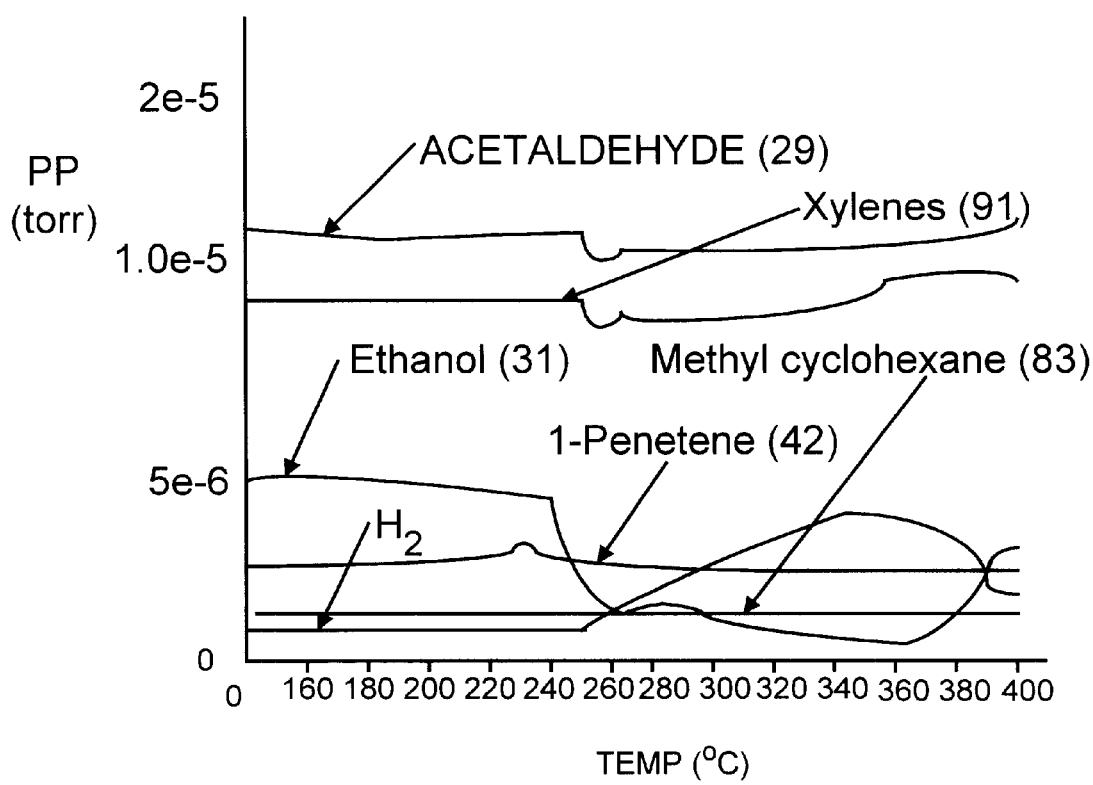

FIGS. 7A and 7B generally illustrate the reaction of 10% ethanol/simulated gasoline over Cu/Al LDH-derived catalyst in accordance with the preferred embodiment. Simulated gasoline is 78% iso-octane, 16% xylenes, 4.9% methyl-cyclohexane and 1.1% 1-pentene. The conditions are 0.150 g Cu/Al LDH, temperature (T) ramp of 2° C./minute, and liquid flow rate of 0.2 ml/min. Similar trends as observed with 10% ethanol/octane of FIGS. 3A and 3B are observed.

Catalyst optimization, for both conventional IC engine applications and fuel cell applications is enabled in accordance with features of the present invention. The identification of various catalyst structure/composition and activity relationships is enabled in accordance with principles of the invention for effective catalyst performance in the presence of hydrocarbons or simulated gasoline.

While the present invention has been described with reference to the details of the embodiments of the invention shown in the drawing, these details are not intended to limit the scope of the invention as claimed in the appended claims.

What is claimed is:

1. A process for in-situ production of hydrogen ($H_2$) for emission reduction from internal combustion engines comprising the steps of:

providing a solid basic catalytic bed with the internal combustion engine;

passing at least a portion of an alcohol containing fuel for the internal combustion engine through said catalyst bed for producing alcohol decomposition reactions to generate a (Hydrogen) $H_2$ gas; and injecting product including said generated (Hydrogen) $H_2$ gas into the internal combustion engine.

2. A process for in-situ production of hydrogen ($H_2$) for emission reduction from internal combustion engines as recited in claim 1 wherein the step of providing said solid basic catalytic bed with the internal combustion engine includes the step of using as a catalyst a layered double hydroxide (LDH)-derived material.

3. A process for in-situ production of hydrogen ($H_2$) for emission reduction from internal combustion engines as recited in claim 2 wherein the step of using as said catalyst said layered double hydroxide (LDH)-derived catalyst includes the step of using a copper containing LDH.

4. A process for in-situ production of hydrogen ($H_2$) for emission reduction from internal combustion engines as recited in claim 2 wherein the step of using as said catalyst said layered double hydroxide (LDH)-derived catalyst includes the step of using other transition metal containing LDH.

5. A process for in-situ production of hydrogen ($H_2$) for emission reduction from internal combustion engines as recited in claim 2 wherein the step of using as said catalyst said layered double hydroxide (LDH)-derived catalyst includes the step of using a copper/aluminum (Cu/Al) LDH.

6. A process for in-situ production of hydrogen ($H_2$) for emission reduction from internal combustion engines as recited in claim 1 wherein the step of passing said alcohol containing fuel through said catalyst bed for producing alcohol decomposition reactions to generate a $H_2$ gas includes the step of providing said alcohol containing fuel includes said alcohol selected from a group of alcohols including ethanol, methanol, proponal, isoproponal, or butanol.

7. A process for in-situ production of hydrogen ($H_2$) for emission reduction from internal combustion engines as recited in claim 1, wherein the step of passing said alcohol containing fuel through said catalyst bed for producing alcohol decomposition reactions to generate a $H_2$ gas includes the step of passing said alcohol containing fuel through said catalyst bed at temperatures for catalytic reactions in a range between ambient and 500° C.

8. A process for in-situ production of hydrogen ($H_2$) for emission reduction from internal combustion engines as recited in claim 1 wherein the step of injecting said generated $H_2$ gas into the internal combustion engine includes the step of utilizing a fuel injection system for injecting fuel containing said generated $H_2$ gas into the internal combustion engine.

9. A process for in-situ production of hydrogen ($H_2$) for emission reduction from internal combustion engines as recited in claim 1 wherein the step of injecting said generated $H_2$ gas into the internal combustion engine includes the step of utilizing a fuel injection system for mixing said fuel containing said generated $H_2$ gas with air and injecting said mixture into the internal combustion engine.

10. A process for in-situ production of hydrogen ($H_2$) for emission reduction from internal combustion engines as recited in claim 1 wherein the step of passing said alcohol containing fuel through said catalyst bed for producing alcohol decomposition reactions to generate a $H_2$ gas includes the step of producing said $H_2$ gas substantially without producing carbon monoxide (CO).

11. Apparatus for in-situ production of hydrogen ($H_2$) for emission reduction from internal combustion engines comprising:
   a solid basic catalytic bed provided with the internal combustion engine;
   at least a portion of an alcohol containing fuel for the internal combustion engine supplied through said catalyst bed for producing alcohol decomposition reactions to generate a $H_2$ gas; and
   a fuel injection system for injecting said generated $H_2$ gas into the internal combustion engine.

12. Apparatus for in-situ production of hydrogen ($H_2$) for emission reduction from internal combustion engines as recited in claim 11 wherein said solid basic catalytic bed includes a layered double hydroxide (LDH)-derived catalyst.

13. Apparatus for in-situ production of hydrogen ($H_2$) for emission reduction from internal combustion engines as recited in claim 11 wherein said solid basic catalytic bed includes a copper (Cu) containing layered double hydroxide (LDH)-derived catalyst.

14. Apparatus for in-situ production of hydrogen ($H_2$) for emission reduction from internal combustion engines as recited in claim 11 wherein said solid basic catalytic bed includes another transition metal; said another transition metal including nickel (Ni) or cobalt (Co).

15. Apparatus for in-situ production of hydrogen ($H_2$) for emission reduction from internal combustion engines as recited in claim 13 wherein said copper (Cu) containing layered double hydroxide (LDH)-derived catalyst includes a copper/aluminum (Cu/Al) LDH-derived catalyst.

16. Apparatus for in-situ production of hydrogen ($H_2$) for emission reduction from internal combustion engines as recited in claim 13 wherein the copper (Cu) is replaced in the synthesis with other transition metals; said other transition metals including nickel (Ni) or cobalt (Co).

17. Apparatus for in-situ production of hydrogen ($H_2$) for emission reduction from internal combustion engines as recited in claim 11 wherein said alcohol containing fuel includes said alcohol selected from a group of alcohols including ethanol, methanol, proponal, isoproponal, or butanol.

18. Apparatus for in-situ production of hydrogen ($H_2$) for emission reduction from internal combustion engines as recited in claim 11 wherein said alcohol containing fuel is supplied through said catalyst bed for catalytic reactions at temperatures in a range between 150° C. through 400° C.

19. Apparatus for in-situ production of hydrogen ($H_2$) for emission reduction from internal combustion engines as recited in claim 11 wherein said fuel injection system mixes said fuel containing said generated $H_2$ gas with air and injects said fuel containing said generated $H_2$ gas and air mixture into the internal combustion engine.

20. Apparatus for in-situ production of hydrogen ($H_2$) for emission reduction from internal combustion engines as recited in claim 11 wherein said generated $H_2$ gas is produced substantially without producing carbon monoxide.

* * * * *